United States Patent
Spann et al.

[11] Patent Number: 6,134,443
[45] Date of Patent: Oct. 17, 2000

[54] METHOD AND APPARATUS OF DIRECTING RADIO FREQUENCY COMMUNICATION IN A COMMUNICATION SYSTEM

[75] Inventors: Robert Craig Spann, Elgin; Stephen Spear, Skokie; Dennis Gilliland, Bartlett, all of Ill.

[73] Assignee: Motorola, Inc., Schaumburg, Ill.

[21] Appl. No.: 09/049,587

[22] Filed: Mar. 27, 1998

[51] Int. Cl.⁷ ........................................... H04Q 7/20
[52] U.S. Cl. ................ 455/450; 455/453; 455/436; 455/433; 455/509; 455/553
[58] Field of Search .................... 455/553, 436, 455/453, 439, 433, 525, 449, 437, 438, 440, 443, 444, 450–52, 513, 509

[56] References Cited

U.S. PATENT DOCUMENTS

| | | | |
|---|---|---|---|
| 5,504,939 | 4/1996 | Mayrand et al. | 455/450 |
| 5,542,093 | 7/1996 | Bodin et al. | 455/436 X |
| 5,878,349 | 3/1999 | Dufour et al. | 455/439 X |

OTHER PUBLICATIONS

European Telecommunication Standard, ETS 300,590, Feb. 1996.
European Telecommunication Standard, ETS 300,577, Apr. 1997.

*Primary Examiner*—Fan Tsang
*Assistant Examiner*—Philip J. Sobutka
*Attorney, Agent, or Firm*—Kenneth A. Haas

[57] ABSTRACT

A method and apparatus in a communication system (300) directs a radio frequency communication from a first radio frequency channel in a first frequency band between a mobile user of a mobile station (310) and a land based network (301). The method includes determining in a base station subsystem (350) allowability of the mobile user to operate in the second frequency band, and assigning the second radio frequency channel in the second frequency band to mobile station (310) when according to the determining step the mobile user is allowed to operate in the second radio frequency band. The determining step is based on an association of a mobile user of mobile station (310) with at least one of a plurality of cells in communication system (300), or a priority information element, or a subscriber identity. The second frequency band is a preferred frequency band which may be a predetermined preferred frequency band, or based on a congestion condition in communication system (300).

26 Claims, 3 Drawing Sheets

METHOD AND APPARATUS OF DIRECTING RADIO FREQUENCY COMMUNICATION IN A COMMUNICATION SYSTEM

FIELD OF THE INVENTION

The present invention relates to the field of communication systems, and ore particularly, to a cellular communication system.

BACKGROUND OF THE INVENTION

In providing cellular communication services, a service provider may provide a cellular service in more than one of the allocated cellular frequency bands in a coverage area. Among competing reasons for having multiple frequency bands in one coverage area, limited capacity of each frequency band to support potential number of mobile users is notable. Moreover, a service provider may offer multiple frequency bands for competing revenue generating reasons. To take advantage of multiple frequency bands, mobile stations normally should have capability to operate in one or more of the frequency bands. However, such multiband capability in a mobile station is not enough to take full advantage of the services. Due to lack of specific protocols, the mobile stations normally access a cellular system without screening for a preferred frequency band. A frequency band, as such, may be used by the mobile stations to its maximum capacity threshold while other preferred congestion free frequency bands remain under utilized. Since there is no specific protocol for assigning or directing mobile stations to a preferred frequency band, the cellular communication system capacity, and the service provider financial revenues are compromised.

Therefore, where cellular services in multiple frequency bands are offered, there is a need for a method and apparatus of directing the mobile stations to a preferred frequency band resource.

SUMMARY OF THE INVENTION

In a communication system that is providing a radio frequency communication over a first radio frequency channel in a first frequency band between a mobile user and a land based network, and is capable of providing said radio frequency communication over at least said first and a second frequency bands, a method and apparatus provides directing the radio frequency communication by determining allowability of the mobile user to operate in the second frequency band, and assigning a second radio frequency channel in the second frequency band to the mobile user when according to the determining step the mobile user is allowed to operate in the second radio frequency band. The communication system has a plurality of communicating cells, and the determining step is according to an association of the radio frequency communication with at least one of the plurality of cells. The association is in a form of transmission and reception of signals required for maintaining the radio frequency communication. The determining step is according to an information associated with the mobile user. The information is a priority information assigned to the mobile user, or a mobile identity information assigned to the mobile user, or both. The second frequency band is a preferred frequency band. The assigning step is in response to existence of the preferred frequency band. The preferred frequency band is a predetermined preferred frequency band, or is selected based on a congestion condition in said communication system, or both. The congestion condition additionally or alternatively is of the first radio frequency band. The assigning step may additionally or alternatively be in response to a handover request in the radio frequency communication. The handover request is generated based on a measurement report in said communication system. To trigger a handover request, a handover criteria in said communication system may be relaxed. The relaxing may be in response to a congestion condition in the communication system. The congestion condition additionally or alternatively is of the first radio frequency band. The second frequency channel is selected from a list of handover candidate frequency channels. A list of handover candidate frequency channels is sorted to include at least one channel frequency in the preferred frequency band. The first and second radio frequency channels are of a control channel type, or of a traffic channel type, or the first radio frequency channel is of a control channel type and the second frequency channel is of a traffic channel type.

In an embodiment of the invention, a method in a communication system includes comparing a priority information element value with a predetermined priority information element value, and determining allowability of a multiband communication service according to a result of the comparing step. Furthermore, the method includes transmitting a message including the priority information element value. The message is an assignment request message, or a handover request message, or both. The method further includes transmitting a list of frequency channels determining an extent of the multiband communication service. The multiband communication service may be limited to include communication service in at least one preferred frequency band. The preferred frequency band is a predetermined frequency band, or is selected based on a congestion condition in the communication system, or both. The priority information element value is according to a value assigned to a mobile user in the communication system. The value alternatively or additionally is according to the mobile user location in the communication system. The value additionally or alternatively corresponds to a cell priority value assigned to a cell among a plurality of cells in the communication system; the cell may be at least in communication with the mobile user. The value additionally or alternatively is according to a subscription of the mobile user in the communication system. The priority information element value is within a range of the predetermined priority information element value in the comparing step said. The communication system is a global system for mobile communications.

In another embodiment of the invention, a method in a communication system includes comparing a subscriber identity with data contained in a database, and determining allowability of a multiband communication service according to a result of the comparing step. The method further includes transmitting a message including the subscriber identity. The transmitting is in response to an identity request message, and the message is an identity response message. The method further includes transmitting a list of frequency channels determining an extent of the multiband communication services. The extent of said multiband communication services is limited to include communication service in at least one preferred frequency band. The preferred frequency band is a predetermined frequency band, or is selected based on a congestion condition in said communication system, or both. The subscriber identity is an international mobile subscriber identity, or a temporary mobile subscriber identity, or both. The step of comparing further includes correlating an international mobile subscriber identity with a temporary mobile subscriber identity associated with said subscriber identity. The communication system is a global system for mobile communications.

In another embodiment of the invention, an apparatus in a communication system includes a mobile station controller including a database holding information associated with a mobile user accessing the communication system, and a base station subsystem in a radio frequency communication with the mobile user, and in a communication with the mobile station controller for communicating the information to the base station subsystem, including means for determining an extent of the radio frequency communication multiband operation based on the information. The information is a subscription information of the mobile user. The information alternatively or additionally is a priority information element. The information alternatively or additionally is an international mobile subscriber identity information. The information alternatively or additionally is a temporary mobile subscriber identity information. The base station subsystem further includes means for requesting the information from the mobile user. The base station subsystem further includes means for storing the information when the requesting means is requesting the information from the mobile user. The base station subsystem further comprising means for comparing the information to a predetermined information associated with the mobile user. The communication system is a global system for mobile communications.

In another embodiment of the invention, in a communication system that is providing a radio frequency communication over a first radio frequency channel in a first frequency band between a mobile station, being used by a mobile user, and a land based network, the land based network and the mobile station are capable of providing the radio frequency communication over at least the first and a second frequency bands, a method includes determining allowability of the mobile station to operate in the second frequency band, and denying a second radio frequency channel in the second radio frequency band to the mobile station when according to the determining step the mobile user is not allowed to operate in the radio frequency band. When the communication system has a plurality of communicating cells, the determining step is according to an association of the radio frequency communication with at least one of the plurality of cells. The association is in a form of transmission and reception of signals required for maintaining the radio frequency communication. The determining step alternatively or additionally is according to an information associated with the mobile user. The information is a priority information, or a mobile identity information, or both assigned to the mobile user. The mobile identity information is an international mobile subscriber identity, or a temporary mobile subscriber identity, or both. The first and second radio frequency channels are of a control channel type, or of a traffic channel type, or both.

In another embodiment of the invention, in a communication system that is providing a radio frequency communication between a mobile station, being used by a mobile user, and a land based network, the land based network and the mobile station are capable of providing the radio frequency communication over a plurality of frequency bands, a method includes determining allowability of the mobile station to operate in the plurality of frequency bands, and limiting the mobile station to operate in a subset of the plurality of frequency bands when according to the determining step the mobile user is not allowed to operate in each frequency band of the plurality of frequency bands. Furthermore, the method includes transmitting a message to the mobile station informing the mobile user about a result of the determining step. The method further includes directing the mobile station to at least one of the plurality of frequency bands which according to the determining step the mobile user is allowed to operate.

BRIEF DESCRIPTION OF THE DRAWING(S)

DETAILED DESCRIPTION OF THE PREFERRED EMBODIMENT(S)

Figure 1:
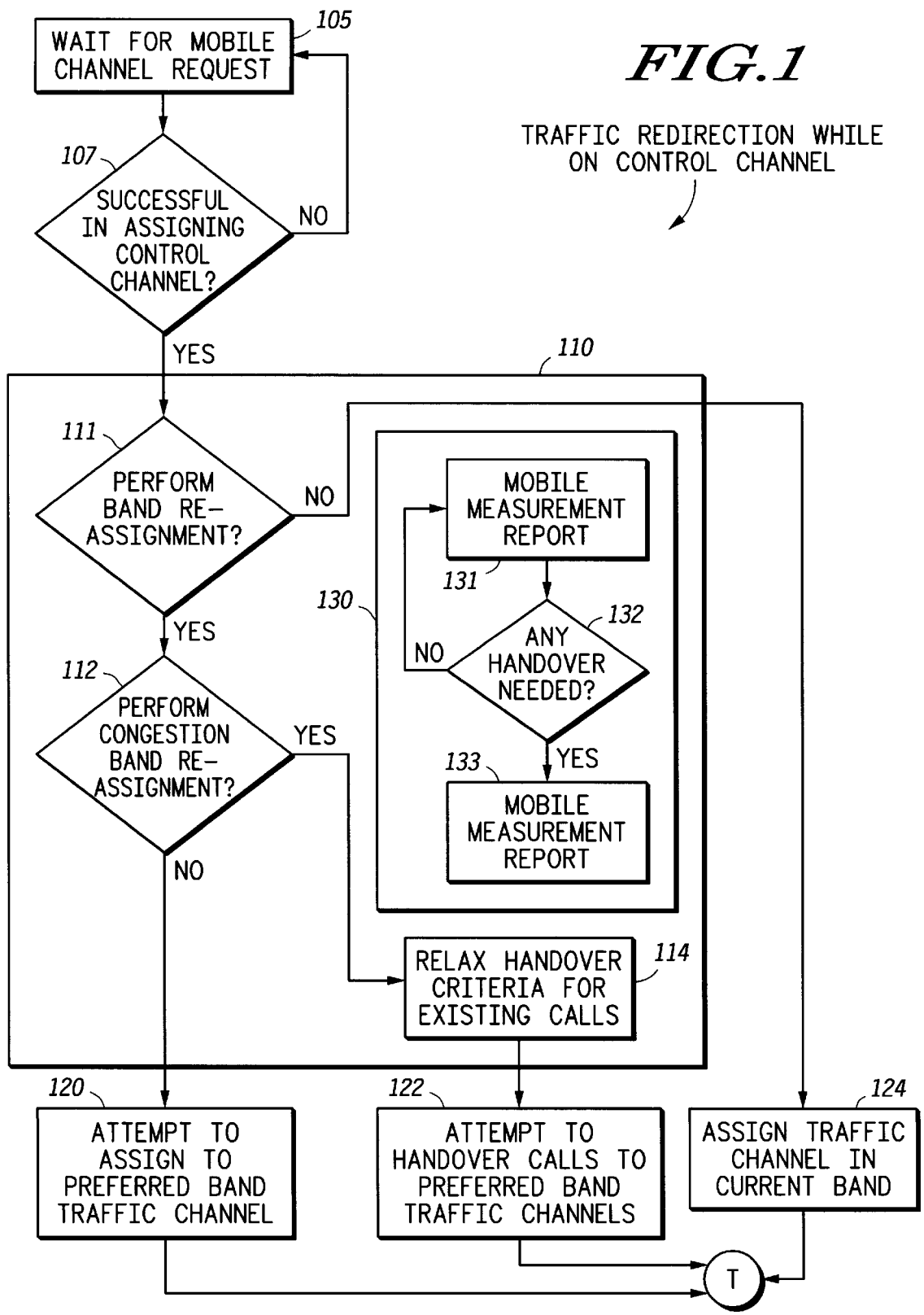
FIG. 1 depicts a flow chart for handover a communication link in a control channel to a preferred frequency band according to various embodiments of the present invention.

According to one or more embodiments of the present invention, a cellular network directs a mobile station (MS) to a radio frequency channel in a preferred frequency band for immediate or subsequent communication. The selection of the preferred frequency band is made after the MS makes an initial access to the network. Accordingly, by directing the mobile stations to a preferred frequency band, congestion of a frequency band is prevented, and cellular service providers can control financial revenues generated from use of each frequency band.

Mobile stations communicate their multiband (MB) hardware capabilities along with the subscription information to the connecting cellular system network upon the initial access. Mobile stations differ by many characteristics. MS subscription and hardware capacity are such characteristics. The subscription information, which is a personalized information, exclusively is included in the MS subscriber identity. Such MS subscriber identity may be included in a MS subscriber identity module (SIM) or in the mobile station hardware. Subscription information includes the terms of the service agreement between the subscriber and the service provider. The MS hardware characteristic is not a personalized characteristic, and is not stored in the SIM card; such that a SIM card may be used with any MS hardware.

One or more messages are initially communicated between the cellular network and the MS to establish a link. These initial messages include factors for determining allowability and extent of the connection service. One such factor is the subscription information which is retrieved from the SIM card and in connection with the network databases. The subscription information indicates whether the connecting subscriber is allowed to use the network services. Another factor is MS hardware capability which is sent through a classmark message to the network. If the network is satisfied with the subscription information, it allows a network connection. Once a service connection is allowed, the extent of services are determined according to MB capability of the MS. If the classmark message transmitted from the MS indicates MB capability, the network extends MB services to the MS. The processes of determining allowability of a service and extend of such service are performed independently in the network. Therefore, once a connection with the network is allowed, the MB capability of MS determines MB services. If suitable agreement between the subscriber and the service provider does not provide MB services, a subscriber is nevertheless able to exploit the MB services with a MB hardware without reciprocating for such service. As such, the service provider financial revenues are compromised.

A connection between a MS and a land based network passes through two distinct phases. In the first phase, all communication between the MS and the network is on a type of channel referred to as control channel. Once the MS successfully completes the control channel messaging handshakes, a channel is uniquely assigned to the MS for duration of communication. The assigned channel is referred to as a traffic channel, and any communication on the traffic channel begins the second phase of communication between the MS and the network.

According to prior art, after a control channel call has been initiated on a frequency band, traffic channels are also forced to be established on the same frequency band. Moreover, if a call handover to other channel frequencies is made between the MS and the network, the newly selected channel frequency is a frequency channel with adequate signal strength. Such frequency channel may be on the initially accessed frequency band or a different frequency band. As a result, the MS confines its cellular communication to channel frequencies that exhibit adequate signal strength. Since the channel frequency selection is made based on signal strength, certain frequency bands with strongest signal strength may become congested while other frequency bands remain under utilized. Moreover, the ability of a cellular communication service provider to direct calls from the initially accessed frequency band to a preferred frequency band is limited.

While not limiting the scope of the present invention, there are three situations where effecting various embodiments of the present invention allow the cellular system operators to limit, diminish, or eliminate congestion of a frequency band when other under utilized frequency bands exist, and direct MS and network communications to a preferred frequency band to maintain economical independence of utilizing various frequency bands. Such frequency band redirection is made per each cell of the cellular system. Therefore, every mobile station accessing a cell is redirected to a preferred frequency band if the criteria for re-direction in each situation has been satisfied. Such redirection may be in a form of prohibiting the MS to take advantage of the MB services, and allowing other MS to roam as freely to any frequency band.

In the first situation, a MS has established a connection with a cellular network at a particular cell on a control channel frequency in a frequency band. Before a traffic channel is assigned to the MS, the cellular network may determine that a control channel handover is needed based on the MS and network reported measurements. If a control channel handover is needed, the cellular network may decide to handover the initially accessed control channel to a control channel in a preferred frequency band. In practice, the period of time which an MS spends on the control channel is very short. Therefore, the chances for re-directing the MS to a preferred frequency band based on a control channel handover event may be very low. If the MS is directed to establish a control channel in a preferred frequency band from a control channel handover, the MS may subsequently establish a traffic channel in the preferred frequency band. The control channel handover is taken as an opportunity to transfer the call to a preferred frequency band, thereby, relieving congestion of the initially accessed frequency band or accomplishing a cost effective use of all available frequency bands provided by the service provider. A control channel handover is always possible before a traffic channel has been assigned. Therefore, control channel handover determination is executed by a process in parallel of all other processes until a traffic channel is actually assigned.

In the second situation, the MS and the network have established communication over the initially accessed control channel, and such communication is leading to a traffic channel assignment. Before a traffic channel is assigned, the cellular network decides whether to perform frequency band re-assignment, and if such decision is made a traffic channel is assigned accordingly. If the cellular network decides not to perform frequency band re-assignment, a traffic channel is immediately assigned on the initially accessed frequency band. If the network prefers a frequency band re-assignment, the network decides whether such determination should be based on congestion levels of the frequency bands or cost effectiveness of using other bands. The service operator determines the cost effective frequency bands. Such frequency bands are operator preferred frequency bands which do not change very often. If frequency band re-assignment is based on cost effectiveness of using other bands, the network assigns a traffic channel in the operator preferred frequency band. If the frequency band re-assignment is based on congestion level, the congestion condition must be satisfied to direct the MS to a traffic channel in another frequency band. Such congestion condition may be of the initially accessed frequency band, or of other available frequency bands, or of all possible frequency bands available in the system.

In the third situation, the MS has established a traffic channel in a frequency band. When the MS has been assigned a traffic channel, it is in a dedicated mode. While an MS is in a dedicated mode, a bidirectional channel of limited capacity is also established between the MS and the network for conveying information about the environment where the MS is operating. Such information includes power measurement reports which may be made by either MS or the network. If the MS is a MB radio, the power measurement report made by the MS normally includes power measurements taken in all or most of the possible frequency bands. While the MS is on the traffic channel, a condition for handover to another traffic channel may be detected. Such condition is very often satisfied when traffic channel link performance does not meet its performance requirements. If a handover is decided, the network takes this opportunity to a re-assign the traffic channel to a preferred frequency band. The preferred frequency band may be one associated with a preferred congestion condition level or one of the operator preferred frequency bands.

In practice, when the network initiate a handover process to effect a frequency band re-assignment, the handover candidates are sorted to include a traffic channel in the preferred frequency band. If at least one traffic channel in the preferred frequency band satisfies its candidacy for taking a handover call, the traffic channel will be handed over to the candidate traffic channel. The candidate list may be limited to include only the frequency channels in the preferred frequency band. Normally, a list of candidate frequency channels are prepared and updated continuously based on various system measurements reported by the MS or the network or both. Such list of candidate frequency channels should contain channel frequencies located in frequency bands other than the initially accessed frequency band. When a frequency band re-assignment is based on congestion level measurement, the candidate priority in the list is modified at the top of the priority to include candidates from other frequency bands. Among such top candidates, a candidate is selected for traffic channel assignment. The selected traffic channel is located in a preferred frequency band. Furthermore, to trigger a handover from the initially accessed frequency band, the criteria for handover from the initially accessed frequency band is relaxed. Such triggering mechanism may be needed because the initially accessed channel may not exhibit normal behavior for triggering a handover, even though a congestion level of the initially accessed frequency band has been detected.

If the traffic channel does not need a handover, the network may take a proactive role to perform a MB handover of the traffic channel to a preferred frequency band. Such proactive role may be based on dynamic or static conditions. For example, in a dynamic condition, the network may decide to handover certain traffic calls to a preferred frequency band. Such preferred frequency band is normally one of the frequency bands that its congestion level is below a congestion condition. The congestion condition dynamically may change depending on the evaluated congestion conditions of available frequency bands. The congestion condition may be predetermined, and not be an actual congestion condition of the frequency band. In a static condition, the network may prefer to transfer traffic calls to an operator defined preferred band. Such preferred band normally does not change. To trigger a MB handover, a handover criteria for MB handover is relaxed from the usual handover criteria. The MB handover criteria is predetermined. The MB handover criteria must be satisfied to trigger a MB handover. If proactive handover is decided, the handover candidate list is sorted to include handover candidates in the preferred frequency band. The handover candidate list may be limited to have only the candidate channels in the preferred frequency band.

The process of handover to a preferred frequency band while an MS is on a control channel is shown by way of a flow chart in FIG. 1. Note that, the first and second situations described above, each occurs while an MS is on a control channel. Such process is implemented per cell basis. Therefore, every MS that is making an access to the cell is evaluated for a frequency band re-assignment. If the MS has MB capability, it may be assigned to a preferred frequency band. At step 105, the network receives a control channel request from an MS. At a step 107, a control channel is assigned to the MS. If such assignment is successful, the MS and the network begin communicating on the assigned control channel. If a MB operation is decided for the MS, at a step 110, the network decides to handover control channel to a preferred frequency band or assign a traffic channel in a preferred frequency band. At a step 130, the network performs continuously a parallel process to determine whether a control channel handover is needed. Such control channel handover, for example, may be needed if the control channel begins to exhibit poor performance. The network, at a step 131, monitors MS reported measurement messages. At a step 132, the network determines if control channel handover is needed. If a control channel handover is needed, the network at a step 133 sorts out the reported handover candidates to include a control channel on a preferred frequency band. The control channel is handed over to a control channel in a preferred frequency band.

At a step 111, if the network decides not to perform a frequency band reassignment for the MS, even though the MS is allowed to have a MB operation, a traffic channel is assigned to the MS in the initially accessed frequency band at a step 124. If a frequency band re-assignment is decided at step 111, the network, then, at a step 112 decides whether to perform such frequency re-assignment based on congestion conditions of the frequency bands. If the frequency re-assignment is decided based on a congestion condition, the network at a step 114 relaxes the handover criteria of the call from the initially accessed frequency band. At a step 122, a traffic channel in a preferred frequency band is selected for the traffic channel handover. The preferred frequency band at step 122 are those frequency bands that do not exhibit the congestion condition. The list of such preferred frequency bands may change upon the network operating conditions, and it is dynamic in nature.

At step 112, if it is determined that the frequency band reassignment is not based on congestion condition, the network assigns to the MS, at a step 120, a traffic channel in an operator preferred frequency band. Such preferred frequency band is selected by the operator and normally does not change dynamically. At the conclusion of step 124, or 120, or 122 a traffic channel is assigned to the MS, and the MS begins the second phase of the communication with the network.

Figure 2:
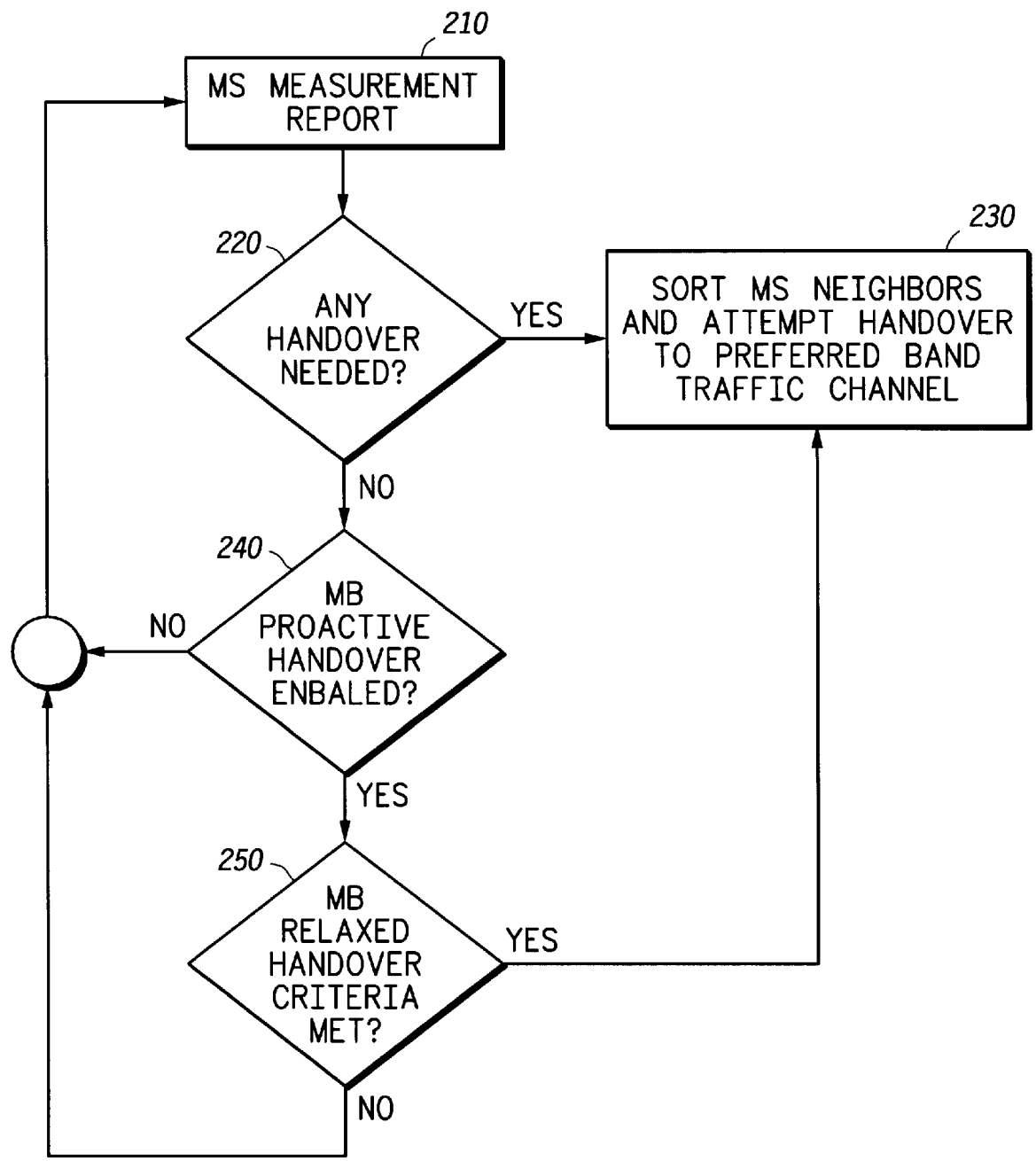
FIG. 2 depicts a flow chart for handover a communication link in a traffic channel to a preferred frequency band according to various embodiments of the present invention.

The process of handover to a preferred frequency band while an MS is on a traffic channel is shown by way of a flow chart in FIG. 2. Note that, the third situation described above occurs while an MS is on a traffic channel. At a step 210, the MS measurement reports are retrieved. At a step 220, the network decides based on the measurement reports retrieved at step 210 whether a handover is needed. If a traffic channel handover is needed, the network sorts the candidate traffic channels to include a traffic channel candidate in the preferred frequency band. Once the candidate list includes a traffic channel in the preferred frequency band, the handover process selects the candidate traffic channel in the preferred frequency band for the handover. If no handover is needed as determined in step 220, the network decides at a step 240 whether it should take a proactive handover process. If proactive handover is not decided, the network begins to evaluate the measurement report at step 210 for any possible future handover. Such measurement report may be made by the MS or the network. If at step 240 the network decides to take a proactive handover, the network relaxes in a step 250 the criteria for triggering a handover process in the traffic channel. If the relaxed handover criteria is satisfied at step 250, a traffic channel handover takes place. The new traffic channel is selected from the list of candidate traffic channels which is sorted at step 230 to include a traffic channel in the preferred frequency band. The selected traffic channel is located in the preferred frequency band. If at step 250 the criteria of the relaxed handover is not satisfied, the network begins to evaluate the measurement report at step 210 for any possible future handover.

According to various embodiments of the invention, by directing the mobile stations to a preferred frequency band, congestion of a frequency band is prevented, and cellular service providers can control financial revenues generated from use of each frequency band. Since the present invention does not include any requirement for active participation of the MS in deciding the handover to a preferred frequency band, the hardware implementation of the present invention exclusively takes place in the network hardware which is controlled by the service providers.

Figure 3:
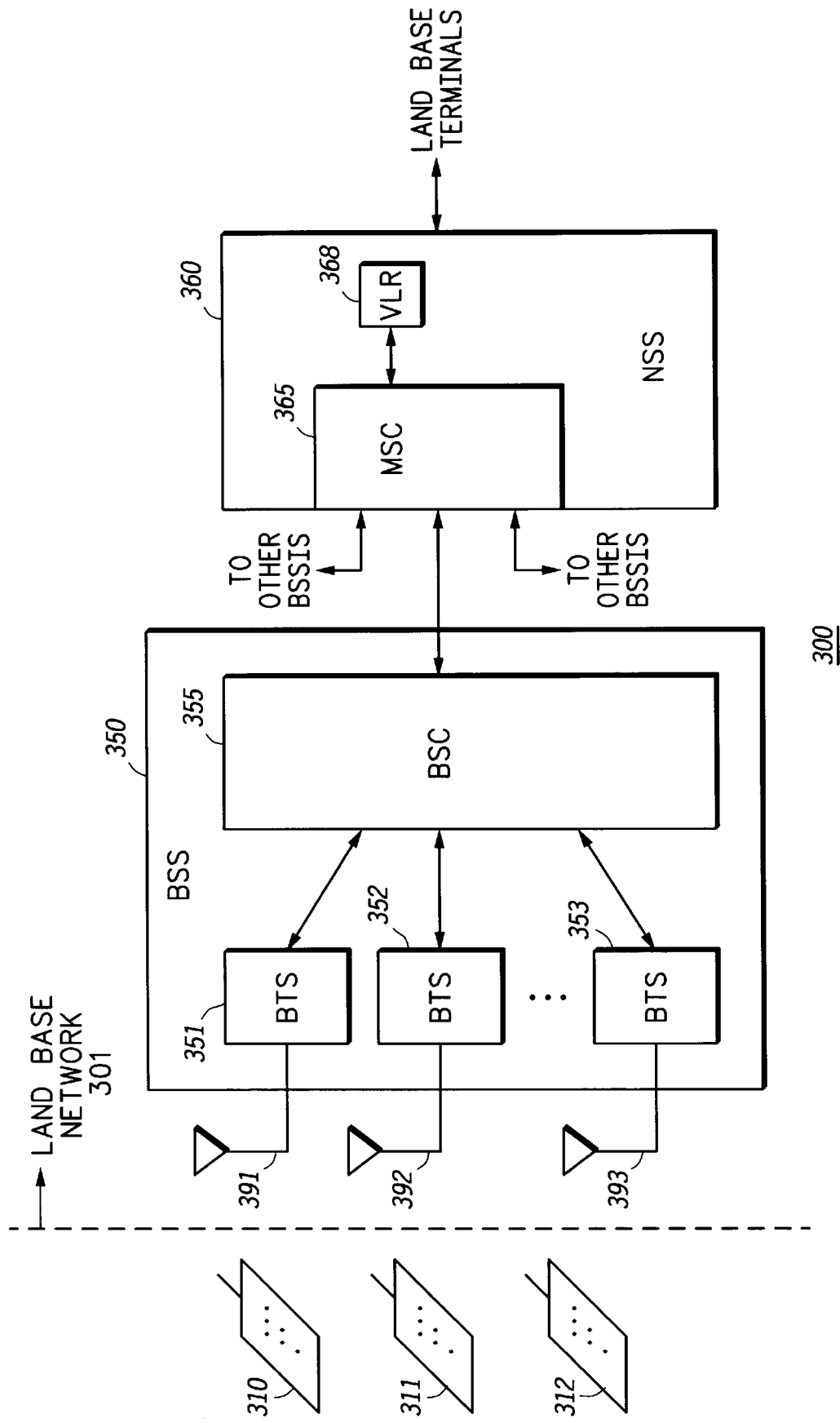
FIG. 3 depicts a block diagram of a cellular network.

Referring to FIG. 3, a simplified block diagram of a communication system 300 is shown which includes a cellular land based network 301. The cellular network 301 includes a base station subsystem (BSS) 350, and a network switching subsystem (NSS) 360. The BSS 350 on one side is in direct radio frequency communication with mobile stations 310–12. The communication system 300 may have many mobile stations, however, only three mobile stations 310–12 are shown in FIG. 3. BSS 350 on another side is directly in communication with NSS 360 which provides the main switching function of the network, and includes data bases for subscribers data and mobility management. NSS 360 includes an MSC 365 that its main function is to coordinate the call set-up from and to mobile stations 310–12. MSC 365 is directly in communication with BSS 350 and other base station subsystems serving other regions. NSS 360 also provides the necessary connections to land base terminals. NSS 360 includes a data base visitor location registration (VLR) 368 of all subscribers. VLR 368 includes some information about current location of the subscribers, and their authentication information. The VLR 368 data base is made immediately available to the MSC 365.

BSS 350 normally is dedicated to one or more cellular regions, where each region has one or more cells. On one side, BSS 350 is in direct radio contact with mobile station 310–12 through base station transceiver sections (BTS) 351–53, and on the other side, it provides radio interface management through base station controller (BSC) 355 with MSC 365 switches. Each BTS may be dedicated to a particular cell and antenna in a region. Each BTS has its own antenna. For example, antennas 391–93 are dedicated to BTS's 351–53 respectively. BSS 350 may have many BTS's serving different cells within a region, however, only three BTS's are shown in FIG. 3.

According to prior art, all radio link management, including determining MB capability of a mobile station, takes place in BSS 350. The service authentication takes place in MSC 365. Such service authentication is according to the information contained in VLR 368 database. VLR 368 database does not include MS hardware capability information. Once a service authentication is completed, the mobile station is directed to have a radio link with the network. Since the radio link management takes place in BSS 350, MB services may be allowed according to radio link interrogation of the MS by BSS 350. Since access authentication is independent of MB service management, a subscriber is nevertheless able to exploit MM services with a MB hardware without reciprocating for MB service. As such, the service provider financial revenues are compromised. Therefore, the service provider may need to determine MB services per MS unit accessing a cell in the cellular system. According to one or more embodiments of the present invention, the network decides whether each MS accessing a cell is allowed to operate in a MB environment. Such MB service determination per MS may be in a form of prohibiting MB services to unauthorized MS's, and allowing other MS's to roam as freely among all available frequency bands.

More specifically, a cellular system service provider may have an existing Global System For Mobile Communication (GSM) in 900 MHz frequency band. The operator may offer one or more segments or all of the 900 MHz frequency band for cellular communication services. More recently, GSM system was extended to provide services in 1800 MHz frequency band. As such, both 900 and 1800 MHz frequency bands may be available in the same coverage area from the same service provider. To take advantage of the MB services, the MS should have MB hardware capability. Multiband mobile stations are available from Motorola, 1501 West Shure Dr., Arlington Heights, Ill. 60004, USA. Since cellular services in 900 MHz frequency band have been offered long before services become available in 1800 MHz frequency band, the 900 MHz system has far more subscribers than 1800 MHz system. For marketing purposes, the service provider may decide to use the GSM 1800 spectrum as a standalone network for new GSM 1800 subscribers, while providing congestion relief features for the heavily loaded GSM 900 system. The present invention prevents unauthorized use of a multiband system services, and provides a method for service provider to decide which MS should be given MB services. Such method is not intrusive to present day SIM arrangement, although its practical consideration is to personalize the mobile station hardware capability. According to various embodiment of the present invention, a service provider defines which MS is allowed to operate in a given band by managing the MS access to a given band.

Specifically for a GSM system defined by European Telecommunication Standard Institute (ETSI), a copy of the standard may be obtained by writing to ETSI, 650 Route des Lucioles-Sophia Antipolis-Valbonne-FRANCE, the optional Priority information element specifically referred to in the GSM protocols, refer to section 3.2.2.18. of TS GSM 08.08 for detail, is included in all applicable messages. These applicable messages include assignment request and handover request messages which are described in TS GSM 08.08 sections 3.2.1.1 and 3.2.1.8 respectively. The priority information assigned to the mobile station is located in VLR 368 and retrieved by MSC 365. MSC 365 main function is to coordinate the call set-up from and to mobile stations 310–12. MSC 365 through its connection with BSS 350 sends the priority message of the mobile stations to BSS 350. The system operator identifies in VLR 368 the subscribers priority access. This priority may have many levels, for example 14 priority levels, and are described in priority element 3.2.2.18, TS GSM 08.08. In BSS 350, the operator defines a threshold priority that is considered acceptable for allowing an MS access to a particular frequency band. BSS 350 incorporates an algorithm that would compare MS priority to a priority threshold level. The priority threshold is stored in BSS 350. If the MS priority satisfies the priority threshold, BSS 350 allows MB services be offered to the MS. This decision is made in BSS 350 which has an independent responsibility, and preserved as such, for managing mobile station radio link. Accordingly, since priority message is transmitted on assignment request and handover request messages, MS can be directed to a preferred frequency band upon any request for channel assignment or handover.

To effectively manage preferred frequency band assignment while a mobile station roams into a new area, or is handed over to a new cell, MSC 365 may adjust the MS subscription priority depending on where the MS is currently located. The current location of each MS is partly known in VLR 368. Furthermore, the operator may assign a priority to all mobile stations currently in communication with a particular BSS. Additionally, the priority may be assigned to all mobile stations communicating through a particular cell at a particular BSS. These types of priority assignment are exclusively made independent of subscription based priority, and may be made for service providers management of frequency band resources, and operator preferred frequency bands. As such, the priority may be implemented according to a regional subscription. Independently or in combination of various types of assigning priority, the MB access may be based on a range of priorities. Collectively, for example, an MS would receive a priority number, then, the BSS allows MB services if the priority is within the definition of a lower bound and an upper bound of priorities.

To determine allowability of an MS for MB services based on the priority information, BSS must receive priority information from MSC 365 to determine whether the MS should be granted access to a preferred frequency band. No measures can be taken for the idle-mode behavior of mobile stations since priority messages are included in messages during access change over events. However, once an MS has established a connection, BSS 350 transmits a message to the MS containing a list of channels refer to as broadcast control channel (BCCH). The MS normally is required to monitor BCCH channels for future access and handover. Such monitoring is through taking power measurement and other quality measurements. The measurement report is communicated to BSS 350 on the radio link side on a regular basis. The BCCH allocation table is shown in section 10.5.2.22. of TS GSM 04.08. Once priority of an MS is verified, BSS 350 changes the list of BCCH channels according to the MS priority. This effects a change of network access for the MS. The list of BCCH channels are modified to include channels that are located in the allowed frequency band. Once the BCCH list is changed to include channel frequencies in the preferred frequency bands, MS operation becomes limited to those channels in the preferred frequency bands. The MS no longer reports to BSS 350 about channel measurements in unauthorized frequency bands. BSS 350 may construct and transmit a short message service point to point (SMS PTP) to inform the subscriber that it is attempting to acquire services in an unauthorized frequency band. Without any notification procedures, mobile stations may not know the reason for denying services.

In another embodiment of the present invention, the International Mobile Subscriber Identity (IMSI) of subscribers are transmitted to the network upon each call access. A unique IMSI is assigned to each subscriber. IMSI is not MS hardware specific; it is personalized and is contained in the SIM card or programmed in the mobile station hardware. Since IMSI is a very important and confidential information, it is not transmitted very often. Its transmission is limited upon an initial contact with a network. After the initial contact, the network assigns a temporary mobile subscriber identity (TMSI) to the subscriber for subsequent identification of the subscriber. TMSI has only a local significance and is randomly generated, and is not universal like IMSI. Each TMSI in MSC 365 is correlated with a unique IMSI in VLR 368 database. A database located in BSS 350 holds a number of IMSI information belonging to a number of subscribers that are allowed to have MB services, or the database may hold IMSI information of those subscribers that are not allowed to have MB services. BSS 350 monitors TS GSM 04.08 messages that are sent by mobile stations to the network. These messages contain IMSI information. BSS 350 compares the IMSI numbers in its database to the IMSI numbers received from mobile stations, and determines the extent of MB services. Although not shown in FIG. 3, BSS 350 incorporates means to store any necessary information, and means to perform the necessary comparing functions, according to various embodiment of the present invention. Such means are readily available, such as memory elements for storing function and digital comparators for comparing functions, or a processor. Accordingly, a MB service is allowed or denied to the MS depending on the determination made by BSS 350.

To receive IMSI, the operators configure the system to have the MS send its IMSI to the network with every connection establishment. If such configuration is not possible, to receive IMSI of a mobile station at times other than the initial connection, the operators may configure VLR 368 database in MSC 365 to avoid allocating a TMSI. Once a TISI is made unavailable, IMSI is reported in appropriate messages in substitute of TMSI. The mobile identity, refer to section 10.5.1.4. of TS GSM 04.08, provides the detail. If the system operator decides that transmission of IMSI is degrading the security of the system, through appropriate messaging available in the system protocols, the IMSI information may be obtainable from MSC 365. In alternative, BSS 350 interrogates the mobile station for its IMSI information for every connection establishment. BSS 350 builds and transmits an identity request message, refer to section 9.2.10. of TS GSM 04.08 for detail, to mobile stations. BSS 350 traps the resulting identity response message from the mobile station, refer to section 9.2.11. of TS GSM 04.08 for detail. In alternative, BSS 350 may request IMSI information to be send from MSC 365 by communicating through one or more messages to MSC 365, although such specific messaging is not currently available in GSM protocols. BSS 350, once it has the IMSI information, controls the MB access management of this particular MS as long as MS is being managed by BSS 350. If MS performs a handover to another BSC in another BSS in contact MSC 365, it would then be necessary to query the MS for the mobile identity again.

If restricting transmission of IMSI information is desired, a periodic interrogation of mobile stations for IMSI information coupled with tracking the correlation between IMSI and TMSI would restrict transmission of IMSI information. In order to perform IMSI and TMSI tracking and correlation, BSS 350 interrogates the mobile station for its IMSI number at least one time if BSS 350 receives a TMSI for which it had no prior correlating history. Prior history normally does not exist when a mobile station makes an initial connection. A correlation is then made between IMSI and TMSI. Given the random nature of TMSI assignment, it is unlikely that a given TMSI would be reused within some defined period. By keeping a timer from the time of a correlation between a TMSI and a IMSI, another IMSI interrogation procedure is initiated when the timer expires after a predetermined period of time. When the period between TMSI re-use is made very long, and timer period is short, effectiveness of this procedure increases substantially.

BSS 350 may acquire IMSI information by monitoring transmission of the following messages, referred to in TS GSM 04.08, from the mobile station.
PAGING RESPONSE (refer to section 9.1.25.)
CM RE-ESTABLISHMENT REQUEST (refer to section 9.2.4)
CM SERVICE REQUEST (refer to section 9.2.9.)
IDENTITY RESPONSE (refer to section 9.2.1 1.)
IMSI DETACH INDICATION (refer to section 9.2.12.)
LOCATION UPDATING REQUEST (refer to section 9.2.15.)

The above messages are typically sent from the MS to MSC 365 transparently via BSS 355. Since BSS 350 needs the mobile identity information, these messages from MS should be monitored by BSS 350. The mobile identity information may be in a form of IMSI or TMSI.

Once an MS is allowed to have MB services by monitoring its mobile identity, BSS 350 ensures that a BCCH allocation table, refer to section 10.5.2.22. of TS GSM 04.08, includes only the channel frequencies in the allowable frequency bands. The MS then only reports measurements of channel frequencies that are in allowed frequency bands. As such, the MB services offered to an MS is confined to the preferred and allowed frequency bands.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a communication system that provides a radio frequency communication over a first radio frequency channel in a first frequency band between a mobile user and a land based network and provides said radio frequency communication over at least said first and a second radio frequency bands, a method of directing said radio frequency communication comprising the steps of:

determining allowability of said mobile user to operate in said second radio frequency band;

assigning a second radio frequency channel in said second radio frequency band to said mobile user when said mobile user is allowed to operate in said second radio frequency band based on said step of determining;

wherein said second frequency band is a preferred frequency band, and said step of assigning is in response to a handover request in said radio frequency communication;

sorting a list of handover candidate frequency channels to include at least one channel frequency in said preferred frequency band; and relaxing a handover criteria in said communication system to trigger said handover request.

2. The method as recited in claim 1 wherein said communication system includes a plurality of cells and said radio frequency communication has a radio link association with at least one of said plurality of cells, said step of determining being based on said radio link association.

3. The method as recited in claim 2 wherein said radio link association is in a form of transmission and reception of signals required for maintaining said radio frequency communication.

4. The method as recited in claim 1 wherein said step of determining is according to an information associated with said mobile user.

5. The method as recited in claim 4 wherein said information is a priority information assigned to said mobile user.

6. The method as recited in claim 4 wherein said information is a mobile identity information assigned to said mobile user.

7. The method as recited in claim 1 wherein said step of assigning is in response to existence of said preferred frequency band.

8. The method as recited in claim 1 wherein said preferred frequency band is a predetermined preferred frequency band.

9. The method as recited in claim 1 wherein said preferred frequency band is selected based on a congestion condition in said communication system.

10. The method as recited in claim 9 wherein said congestion condition is of said first radio frequency band.

11. The method as recited in claim 1 wherein said handover request is generated based on a measurement report in said communication system.

12. The method as recited in claim 1 wherein the step of relaxing is in response to a congestion condition in said communication system.

13. The method as recited in claim 12 wherein said congestion condition is of said first radio frequency band.

14. The method as recited in claim 1 wherein said second frequency channel is selected from a list of handover candidate frequency channels.

15. The method as recited in claim 1 wherein said first and second radio frequency channels are of a control channel type.

16. The method as recited in claim 1 wherein said first and second radio frequency channels are of a traffic channel type.

17. The method as recited in claim 1 wherein said first radio frequency channel is of a control channel type and said second frequency channel is of a traffic channel type.

18. An apparatus in a communication system comprising:

a mobile station controller including a database holding information associated with a mobile user accessing said communication system; and a base station subsystem in a radio frequency communication with said mobile user, and in a communication with said mobile station controller for communicating said information to said base station subsystem, including means for determining an extent of said radio frequency communication multiband operation based on said information.

19. The apparatus as recited in claim 18 wherein said information is a subscription information of said mobile user.

20. The apparatus as recited in claim 18 wherein said information is a priority information element.

21. The apparatus as recited in claim 18 wherein said information is an international mobile subscriber identity information.

22. The apparatus as recited in claim 18 wherein said information is a temporary mobile subscriber identity information.

23. The apparatus as recited in claim 18 wherein said base station subsystem further comprising means for requesting said information from said mobile user.

24. The apparatus as recited in claim 23 wherein said base station subsystem further comprising means for storing said information when said requesting means is requesting said information from said mobile user.

25. The apparatus as recited in claim 18 wherein said base station subsystem further comprising means for comparing said information to a predetermined information associated with said mobile user.

26. The apparatus as recited in claim 18 wherein said communication system is a global system for mobile communications.

* * * * *